United States Patent [19]

Ducate, Jr. et al.

[11] Patent Number: 4,886,045
[45] Date of Patent: Dec. 12, 1989

[54] SIDE BURNER ATTACHMENT FOR GAS-FIRED GRILL

[75] Inventors: John S. Ducate, Jr., Columbia; Bernard Berger, Aiken, both of S.C.; Neal Boatwright, New Berg, Ind.; Jon S. Walters, Chesterfield, Mo.

[73] Assignee: The Ducane Company, Inc., Columbia, S.C.

[21] Appl. No.: 346,489

[22] Filed: May 2, 1989

[51] Int. Cl.$^4$ .......................... A47J 37/00; F24C 3/00
[52] U.S. Cl. .................................................. 126/41 R
[58] Field of Search .................................... 126/41 R

[56] References Cited

U.S. PATENT DOCUMENTS 3,802,413  4/1974  Pepin .
4,446,846  5/1984  Hahn .
4,524,751  6/1985  Hoglund .
4,587,948  5/1986  Haglund .
4,635,613  1/1987  Tucker et al. .
4,665,891  5/1987  Nemec et al. .
4,677,964  7/1987  Lohmeyer et al. ............... 126/41 R
4,681,083  7/1987  Shu .
4,688,541  8/1987  Stephen et al. .

Primary Examiner—Carroll B. Dority
Attorney, Agent, or Firm—Pollock, Vande Sande & Priddy

[57] ABSTRACT

A side cooker apparatus for a gas-fired grill which is detachably secured at one side of the grill by a pair of substantially parallel, spaced apart bars which are attached to the framework of the side cooker apparatus and extend into a pair of correspondingly spaced apart channels which form part of a framework for the gas-fired grill. A safety barrier may be provided for retaining cooking utensils on the side cooker.

21 Claims, 5 Drawing Sheets

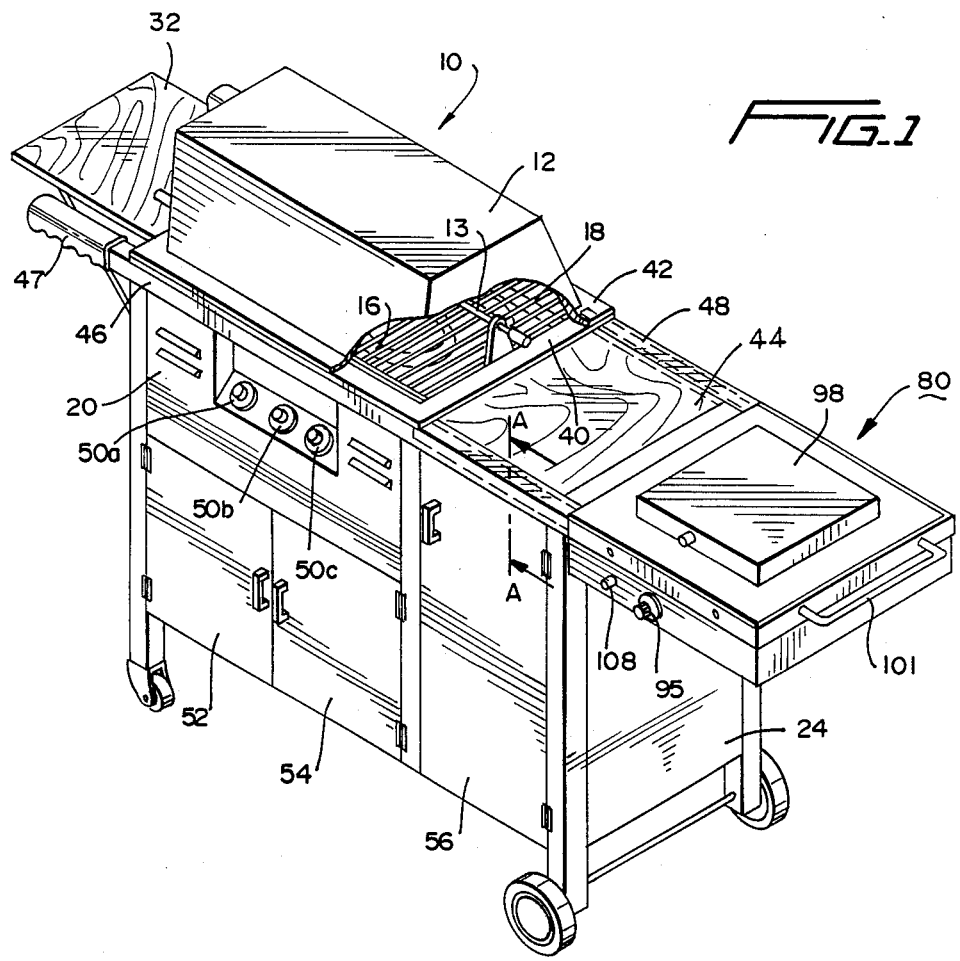
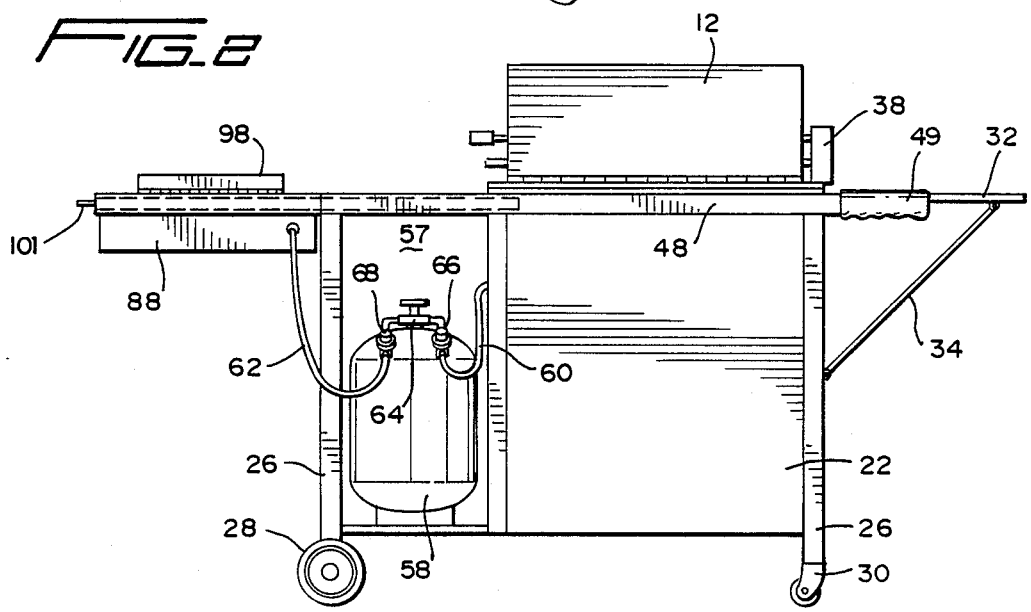

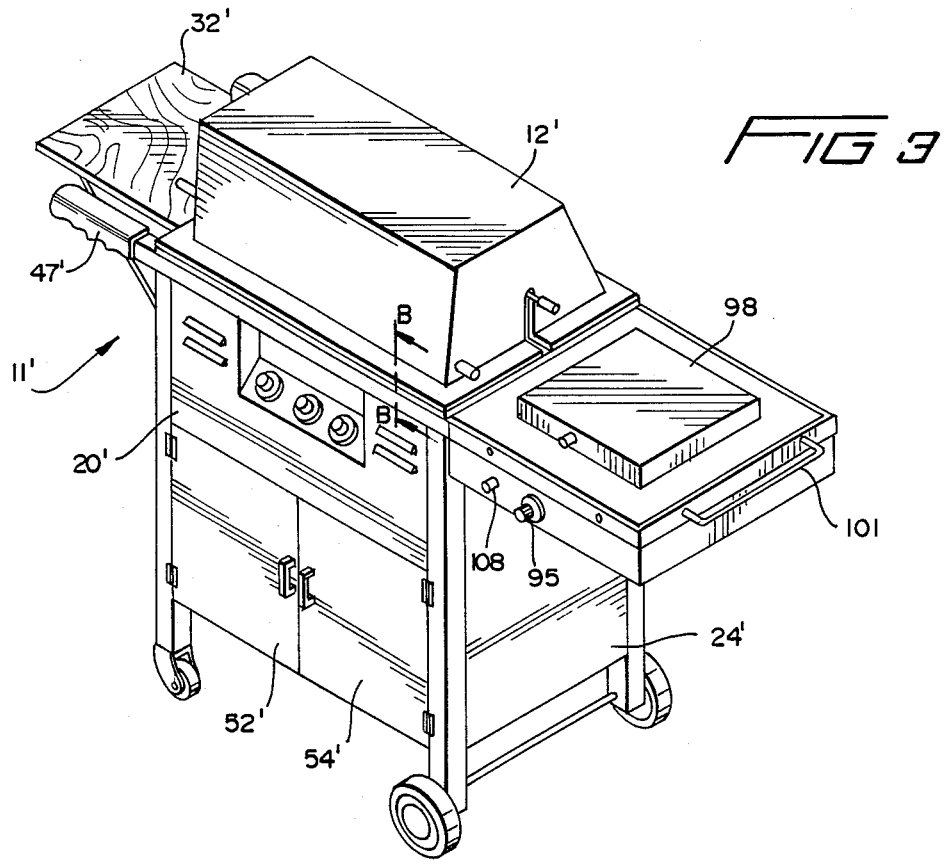
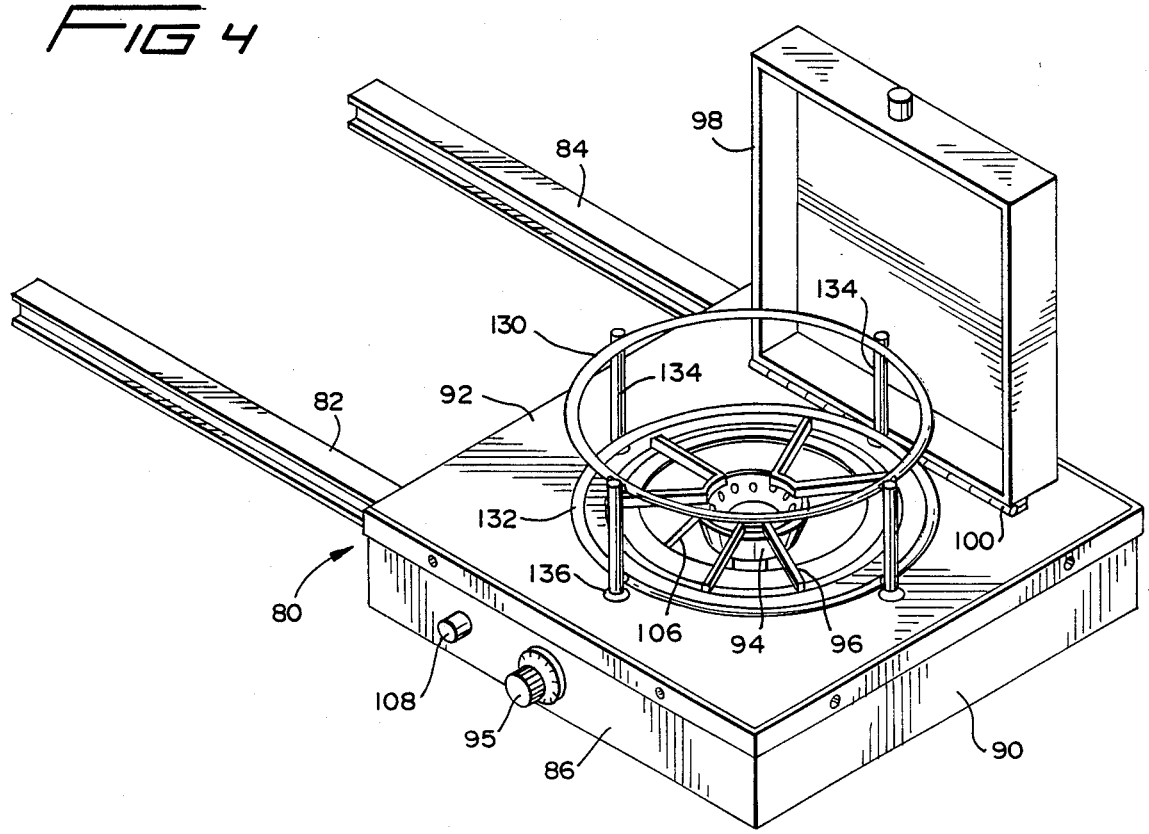

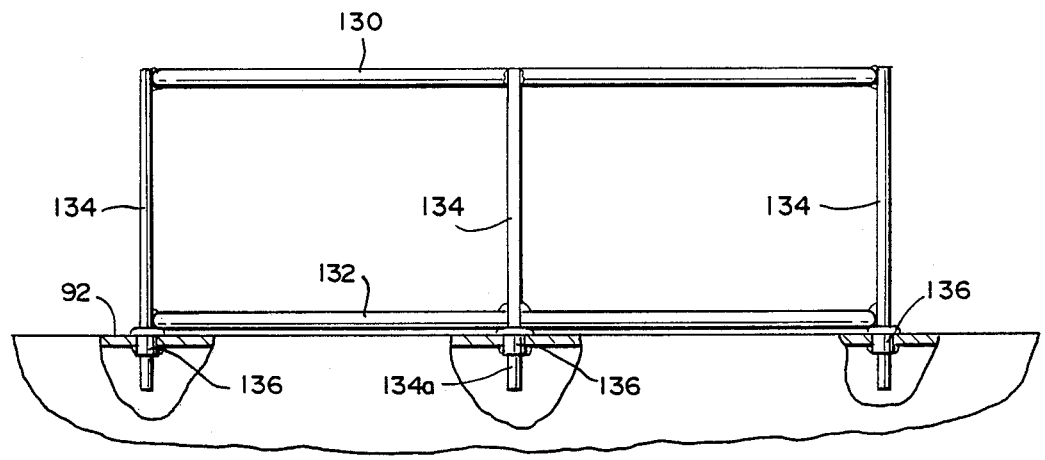
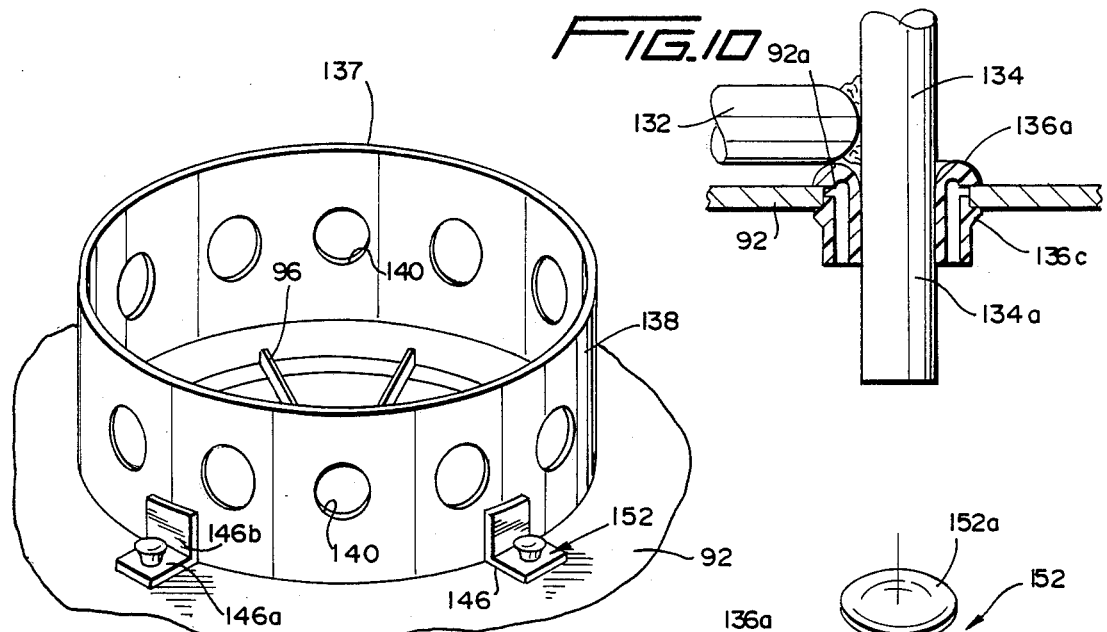
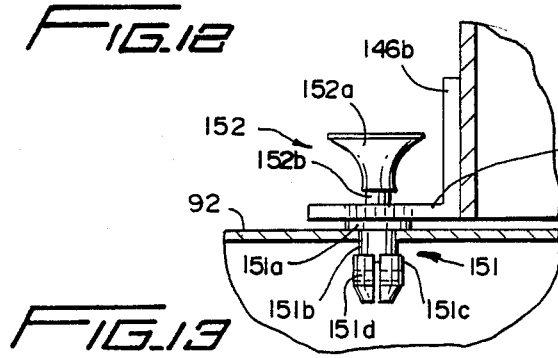
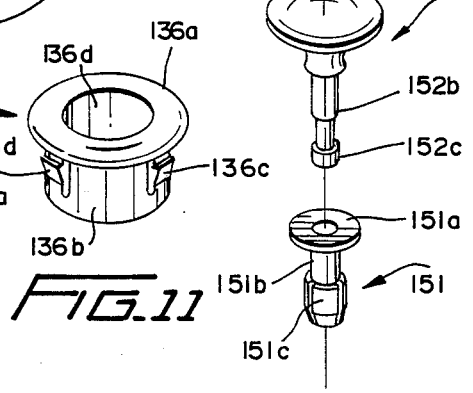

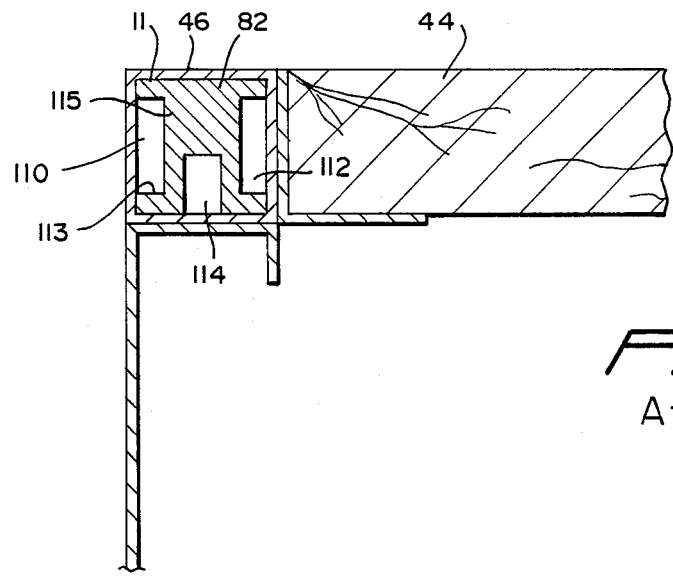
FIG_5
A-A
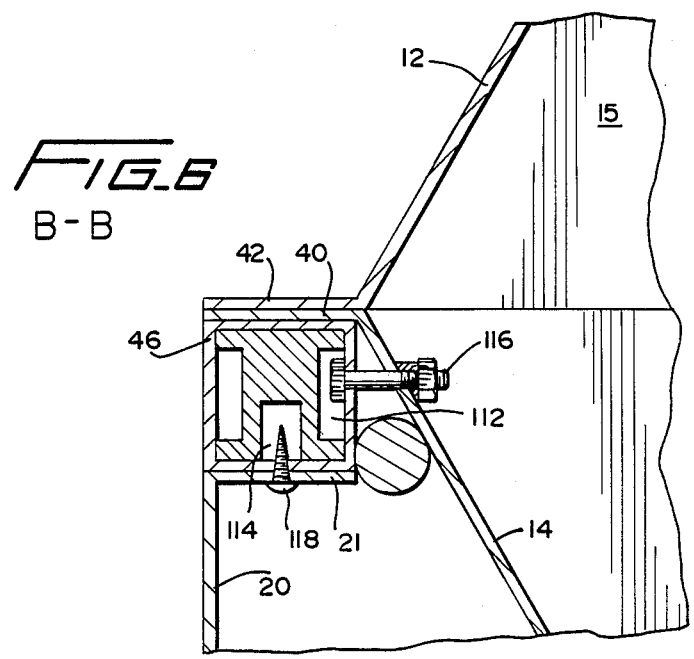
FIG_6
B-B

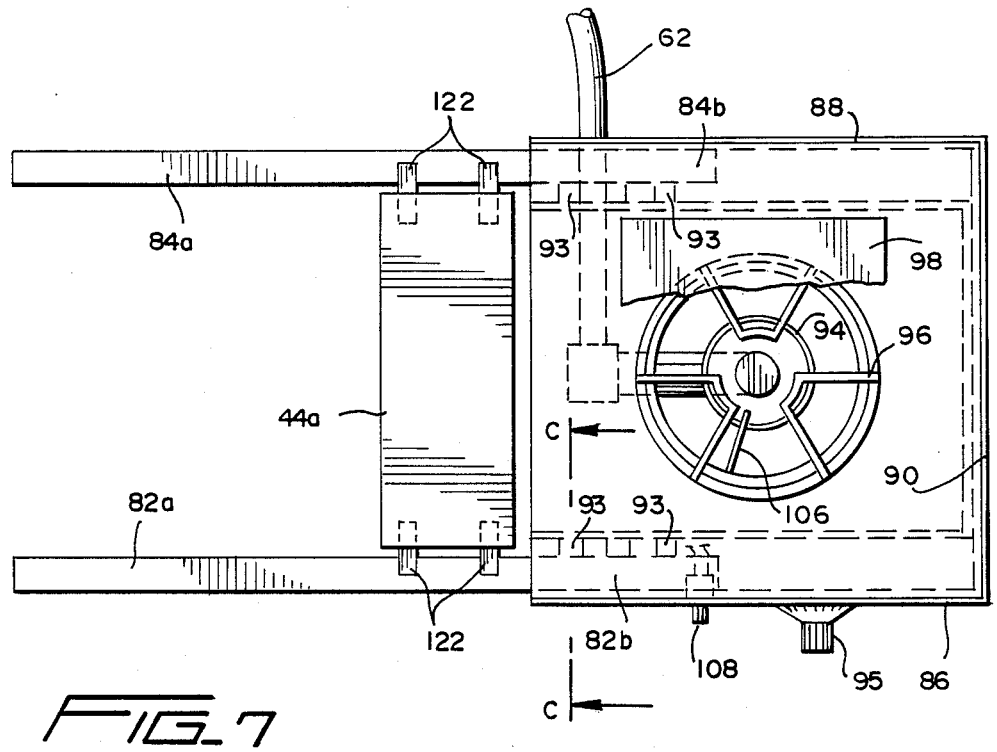
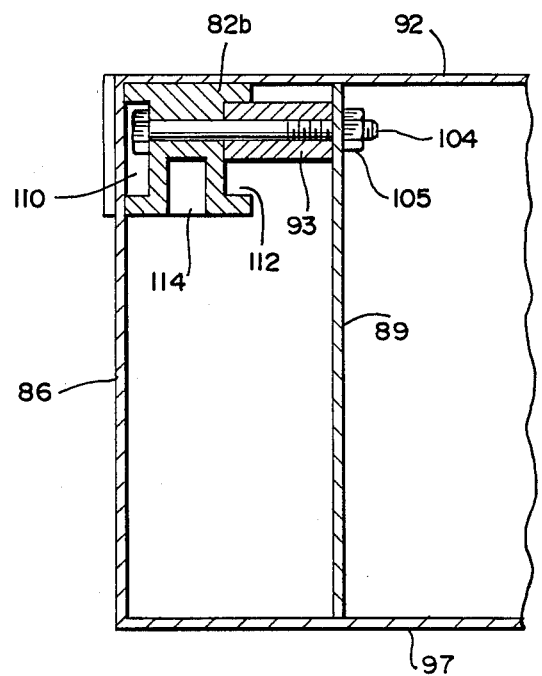

SIDE BURNER ATTACHMENT FOR GAS-FIRED GRILL

The present invention relates generally to accessories for gas-fired grills and more particularly to an accessory for a gas-fired grill which provides a supplemental cooking section.

BACKGROUND OF THE INVENTION

Conventional gas-fired grills consist of a housing base containing a gas burner positioned beneath a fire grate which supports briquettes such as lava rocks. A cooking grid on which food to be grilled is suspended above the briquettes, and heat from the burning gas is transferred to the briquettes which provides radiant heat for cooking food on the grid. Cooking methods which require heating foods in a container, such as a pot or pan, cannot practically be carried out using a conventional grill because efficient use of these methods require that the gas flame be close to or in contact with the pot or pan.

Attempts have been made in the prior art to provide cooking apparatus which combines the features of grills and conventional cookers. See for example, the following U.S. Patents:

- U.S. Pat. No. 4,681,083 to Shu which describes a portable device for cooking, roasting and barbecuing;
- U.S. Pat. No. 3,802,413 to Pepin which describes a combination of a barbecue grill and a cooking stove;
- U.S. Pat. No. 4,524,751 to Hoglund which describes a portable camp stove having a grill section and a gas burner section;
- U.S. Pat. No. 4,587,948 to Haglund which describes two cooking sections which are hinged together; and,
- U.S. Pat. No. 4,446,846 to Hahn which describes a table top grill containing 2 sets of firegrate modules, one for a grilling operation and the other for a pot or pan cooking operation.

While these prior art grills do provide means for simultaneously carrying out both a grilling operation and a pot or pan cooking operation, an improved arrangement for attaching an auxiliary burner to a gas-fired grill is desirable.

SUMMARY OF THE INVENTION

A principal object of the invention is to provide an auxiliary burner apparatus for use with a gas-fired grill.

In accordance with the present invention there is provided a side cooker apparatus for a gas-fired grill which has a source of gaseous fuel and a housing having a front wall opposite to a rear wall and two opposing sidewalls defining a compartment for a main gas burner. The side cooker apparatus comprises a pair of substantially parallel bars, each of which has a holding portion and a projecting portion; an auxiliary gas burner supported between the holding portions of these bars; and, a pair of channel members fixedly mounted on the housing and each extending along a corresponding one of the opposing front and rear walls of the housing. The channel members are dimensioned and arranged for slidably receiving the projecting portions of the parallel bars so that the auxiliary gas burner is detachably mounted on the gas fired grill in a cantilevered position to one side of the housing. Conduit means is provided to transfer fluid fuel between the source of fuel and the auxiliary burner.

The side cooker apparatus provided in accordance with this invention is especially adapted for use with gas-fired grills already on the market. For example, it is particularly well-suited for use with a variety of gas-fired grills manufactured by Ducane Industries, Inc.

BRIEF DESCRIPTION OF THE DRAWINGS

The invention is further described in the detailed description below taken in conjunction with the accompanying drawings in which:

FIG. 1 is an isometric view of a gas-fired grill unit which includes one embodiment of the side cooker apparatus of the present invention.

FIG. 2 is a rear elevational view of the embodiment of FIG. 1.

FIG. 3 is an isometric view of the side cooker apparatus of FIG. 1 supported by a modified gas-fired grill unit.

FIG. 4 is an isometric view of the side cooker apparatus of the invention as separated from the gas-fired grill units of FIGS. 1 and 3, and further showing a safety barrier surrounding the burner FIG. 5 is a partial sectional view taken along line A—A of FIG. 1.

FIG. 6 is a partial sectional view taken along line B—B of FIG. 3.

FIG. 7 is a plan view of the side cooker apparatus shown in FIG. 4.

FIG. 8 is a partial sectional view taken along line C—C of FIG. 7.

FIG. 9 is an elevational view of the embodiment of the safety barrier shown in FIG. 4.

FIG. 10 is a partial sectional view of details of means securing the safety barrier of FIG. 9 to the top of the side cooker.

FIG. 11 is an isometric view of a grommet shown in FIGS. 9 and 10.

FIG. 12 is an isometric view of another embodiment of a safety barrier.

FIG. 13 is a partial sectional view of means for fastening the safety barrier of FIG. 12 to the top of the side cooker.

FIG. 14 is an exploded isometric view showing details of the fastening means of FIG. 13.

DETAILED DESCRIPTION OF THE INVENTION

The embodiment of the side cooker shown in the drawings and described herein in detail is a preferred embodiment of the invention. Since this invention is capable of use in many different forms, it is understood that the detailed description herein is not intended to limit the invention to the embodiment illustrated.

As shown in FIG. 1 of the drawings, side cooker 80 according to the present invention is secured to a grill 10 by means described hereinafter. The grill 10, as shown and described, is of the type manufactured and marketed by Ducane Industries, Inc., of Columbia, South Carolina, and includes a work counter 32, and a cutting board component 44 (preferably made of wood). A main firebox 14 (FIG. 6) is provided with a rim 40 which abuts against a rim 42 of a hood 12. The firebox 14 is enclosed in a grill cabinet 11 comprising a front wall panel 20, a rear panel 22 and a panel at each end, only end panel 24 being shown. A main gas burner 16 and a cooking grid 18 are mounted in a cooking chamber 15 between firebox 14 and hood 12. A rotisserie 13 is mounted above grid 18 and is driven by an electric motor 38.

A fuel tank 58 is mounted in a compartment 57 behind a front door 56. A rear door (not shown) having a slot or aperture for a gas line 62 also may be provided at the rear of compartment 57. Fuel is transferred between fuel tank 58 and main burner 16 through a main valve 64, a pressure reducer 66, a conduit 60 and any one or more of valves 50a, 50b and 50c, which are mounted behind a front wall panel 20 which is positioned above a pair of doors 52, 54.

The firebox 14 and hood 12 are supported on a pair of parallel channels 46, 48, which form a pair of handles 47, 49, one of which is seen in FIG. 6, and extend from adjacent work counter 32 to the outer side edge of cutting board component 44. A plurality of bolts 116, one of which is seen in FIG. 6, secures channel 46 to base 14 and front wall panel 20 is secured to channel 46 by a plurality of screws 118 which pass through a panel flange 21. A rod 120 is secured, as by welding, to firebox 14 and/or to channel 46 to prevent the channel from distorting as a result of the forces exerted by bolt 116. The top of channel 46 also may be welded to overlapping rim 40. A similar arrangement secures rear wall panel 22 and the rear wall of firebox 14 to rear channel 48.

Work counter 32, which is positioned between handles 47, 49, is held in a working position by a support 34, and is attached to the side of the grill cabinet by hinges (not shown) to permit folding the work counter 32 into a vertical position, thus permitting convenient access to handles 47 and 49 for moving th grill.

The entire assembly is supported by four legs 26, one at each corner, which are provided at their lower ends with casters 30 at the side of the grill near the handles 47, 49, and wheels 28 at the side near the fuel tank 58.

The grill assembly shown in FIG. 3 is similar to that shown in FIG. 1, the principal differences being the elimination of the cutting board component 44, and the positioning of the fuel tank in the space behind the front wall panel 20′ and doors 52′, 54′ of cabinet 11′.

As shown in FIGS. 4, 7 and 8, the side cooker apparatus 80 includes a box-like structure defined by a front wall 86, a back wall 88, an end wall 90, a bottom wall 97 and a top wall 92. The top wall 92 is provided with an aperture in which an auxiliary gas burner 94 and a utensil support 96 are mounted. Fuel is transferred between fuel tank 58 and auxiliary gas burner 94 through main valve 64, a second pressure reducer 68, a second gas line 62 and a control valve 95 mounted behind front wall 86. The burner is lit by an igniter 106 which dischargers a spark to burner 94 when activated by pushing a button 108 which is also mounted in front wall 86.

A gas burner cover 98 is pivotally mounted on top wall 92 by a hinge 100. The side cooker 80 is detachably mounted on grill 10 by a pair of parallel bars 82, 84 which have projecting portions 82a, 84a and holding portions 82b and 84b, respectively. Bars 82 and 84 are spaced transversely apart and are sized to fit within the front channel 46 and the rear channel 48, respectively, of the grill. In the preferred embodiment shown, these bars have an I-shape cross-section, which provides an outer recess 110, an inner recess 112 and a lower recess 114 (see FIGS. 5 and 6). The recesses 110, 112 and 114 may be made by cutting corresponding slots in rectangular bar stock so as to form a head portion 111 and a foot portion 113 connected respectively by a central rib 115 as shown in FIG. 5. These respective recesses are provided to enable each bar to be inserted within its corresponding channel and slide past the heads of bolts 116 and the threaded tips of screws 118, since each of these elongated fastening elements extends past the inner surfaces of channels 46, 48. A handle 101 secured to the outer side edge of side cooker 80 provides a hand grip for implementing such sliding movement when attaching or detaching the side cooker.

The length of the projecting portions 82a, 84a must extend into the corresponding channels for a distance sufficient to support the entire weight of the cantilevered portion of the side cooker apparatus. Accordingly, these portions preferably extend for at least one-third of the length of the channels into which they fit. More preferably, these projecting portions extend more than one-half and may extend the entire length of channels 46, 48. The bars are preferably long enough so that the side cooker is firmly anchored in place. For example, in the embodiment of FIGS. 1 and 2, the bars preferably extend all the way past the intermediate cutting board component and into the channel portions adjacent to the firebox 14, as shown in these FIGURES.

In a preferred embodiment of the invention, as shown in FIG. 8, the holding portions 82b, 84b are secured to the frame of the side cooker by means providing for their lateral adjustment so as to enable use of the side cooker with grills having different lateral spacings between channels 46 and 48. As shown in FIG. 8, bolt 104 passes through bar 82b and an elongated spacer member 93 and is secured to an inner frame wall 89 by a nut 105. The plurality of spacer members 93, as shown in FIG. 7, provides means for changing the distances between bars 82 and 84 by using spacers 93 of different lengths. Spacers 93 are preferably made as elongated hollow pins. However, these pins may be replaced by one or more rectangular blocks extending parallel to a corresponding bar and having a plurality of bores for bolts 104.

As shown in FIG. 7, the side cooker also may provide support on projecting portions 82a, 84a for an auxiliary work counter 44a. As shown, work counter 44a is supported by four stepped brackets 122, each of which has a lower horizontal arm extending beneath auxiliary work counter 44a and an upper horizontal arm for resting on bar portions 82a, 84a. The counter 44a may be made of wood to provide a cutting board-like component 44, and is especially useful for grills of the type shown in FIG. 3.

In a preferred embodiment of the invention, the side cooker is provided with a safety barrier to retain pots or other cooking vessels in place and keep them from sliding off the burner or being accidentally knocked over. One embodiment of the safety barrier, as shown in FIGS. 4, 9 and 10, consists of a plurality of spaced-apart, substantially horizontal coaxial wire rings 130, 132, supported above the burner element 94 by a plurality of vertically extending legs 134 which are secured to wire rings 130, 132 as by welding. The lower portions 134a of each leg 134 passes through an axial passage in a grommet 136 which is positioned in an aperture 92a in the top surface 92 of the side cooker. In a preferred embodiment shown in FIGS. 10 and 11, grommet 136 consists of cylindrical sidewall 136b, head 136a integral with body 136b, and at least two resilient fingers 136c projecting radially outward from sidewall 136b. Fingers 136c are forced inwardly when grommet 136 is inserted in aperture 92a and then snap out. Grommets which are thus locked in place can only be removed by pressing fingers 136c inwardly until they clear opening 92a. In this embodiment, the safety ring is readily removed from the side cooker.

The spacing between rings 130, 132, and the height of upper ring 130 above top surface 92 are not critical; however, upper ring 130 is preferably positioned low enough so that it does not obstruct handles on cooking vessels, and may suitably extend from less than about 3 inches to over 6 inches above the cooking surface.

The safety barrier may be made in other configurations such as, for example, a cylindrical band, one embodiment of which is shown in FIGS. 12 and 13. In this embodiment, the safety barrier comprises cylindrical wall 137 having outer surface 138 and a plurality of perforations 140. A plurality of circumferentially-spaced right angle members 146, each having a vertical leg 146b and a horizontal leg 146a are secured, as by welding, to the lower outer surface 138 of wall 137. The safety barrier is secured to the top wall 92 by a plurality of safety elements 152, each of which passes through an aperture in a horizontal leg 146a of a right angle member 146, and co-acts with a grommet 151 to hold the safety barrier in place. As shown in FIGS. 13 and 14, grommet 151 consists of upper disk 151a, cylindrical shell 151b and fingers 151c. When fastening element 152 is inserted into grommet 151, the bulbous portion 152c at the lower end of shank 152b engages groove 151d which is formed on the inner surface of fingers 151c. This embodiment of a fastener element and grommet to hold the safety barrier in place may be configured to prevent separation of the fastening element from the grommet and thus ensure that the safety barrier remains in place. For example, mating horizontal surfaces on the top of the bulbous portion 152c and upper edge of groove 151d in grommet 151 will restrict upward movement of fastener means 152.

The safety barrier is preferably made of a metal such as aluminum or stainless steel which is corrosion-resistant. The grommets are preferably made of a heat-resistant, non-metallic material such as a synthetic resin.

The safety barrier may be made in a variety of sizes and configurations including rectangular shapes, and may cover an area significantly greater than that of the burner opening in order to retain relatively large pots and pans in place over the burner.

It is obvious that the side cooker of this invention may be used with a variety of grills, the only requirement being that the frame of the grill be provided with a pair of channels to permit insertion therein of projecting portions of the bars supporting the side cooker.

The invention will now be more specifically described by the claims which follow.

What is claimed is:

1. A side cooker apparatus on a gas-fired grill having a fuel supply means and a housing defining a compartment with a main gas burner and including a front wall opposite to a rear wall, said apparatus comprising:
   a pair of substantially parallel bars, each of said bars having a holding portion and a projecting portion;
   an auxiliary gas burner supported between said holding portions of said bars; and,
   a pair of channel members fixedly mounted on said housing and each extending along a corresponding one of said opposing front and rear walls of said housing, said channel members being dimensioned for slidably receiving therein said projecting portions of said bars so that said auxiliary gas burner is detachably mounted on said gas-fired grill in a cantilevered position to one side of said housing.

2. A side cooker apparatus according to claim 1 for a gas-fired grill having a fuel supply means, and further comprising conduit means for conveying a fluid fuel between said fuel supply means and said auxiliary burner.

3. A side cooker apparatus according to claim 1 further comprising a side cooker frame for supporting said auxiliary gas burner between said holding portions of said bars, said frame having a front wall opposite to a rear wall and each of said walls being connected to a corresponding one of the holding portions of said bars.

4. A side cooker apparatus according to claim 3 further comprising a spacer means for connecting at least one of the front and rear walls of said side cooker frame at different distances from said corresponding holding portion of at least one of said bars such that side cooker frames of different dimensions may be mounted between said holding portions of said bars.

5. A side cooker apparatus according to claim 4 in which said spacer means comprises two opposing sets of spacers, each having at least two elongated pins extending in parallel relation between a corresponding one of said front and rear frame walls and the holding portion of a corresponding one of said bars.

6. A side cooker apparatus according to claim 4 in which said spacer means comprises a member projecting laterally inward from the holding portion of a corresponding one of said bars, and in which the holding portion of said corresponding bar has an I-shape in cross-section defined by a central rib connecting transversely extending head and foot portions which form on an inward side of said rib a groove for receiving the proximal end of said projecting spacer member.

7. A side cooker apparatus according to claim 3 which further comprises mounting means connected between said holding portions of said bars for supporting said cooker frame such that a major portion of said side cooker frame is cantilevered beyond the outer ends of said holding portions of said bars 8. A side cooker apparatus according to claim 3 wherein said side cooker frame includes handle means for aiding sliding movement of said bars within said channel members.

9. A side cooker apparatus according to claim 1 wherein said cantilevered position is spaced from one side of said housing by a distance sufficient to receive an auxiliary work surface, and wherein said side cooker apparatus further comprises means for supporting said auxiliary work surface between intermediate portions of said bars located intermediate between said projecting portions and said holding portions of said bars.

10. A side cooker apparatus according to claim 9 in which said auxiliary work surface comprises a cutting board made of wood.

11. A side cooker apparatus according to claim 1 in which said bars have an I-shape in cross-section with a rib portion extending vertically between transversely extending head and foot portions.

12. A side cooker apparatus according to claim 11 in which said foot portion of said bars has a groove for receiving a guide means for guiding sliding movement of said projecting portions of said bars within said channel members.

13. In combination with a gas-fired grill apparatus having a compartment with a main gas burner defined by a housing with a front wall opposite to a rear wall, means mounting an auxiliary burner to one side of said housing comprising:
- a pair of substantially parallel bars wherein each of said bars has a holding portion and a projecting portion;
- a side cooker frame supporting said auxiliary burner;
- means for connecting said frame between said holding portions of said bars; and,
- a pair of channel members fixedly mounted on said housing and each extending along a corresponding one of said opposing front and rear walls of said housing, said channel members being dimensioned for slidably receiving said projecting portions of said bars so that said side cooker frame is detachably mounted on said gas-fired grill in said cantilevered position to one side of said housing.

14. A mounting means according to claim 13 in combination with a grill apparatus having a fuel supply means, wherein said frame means further includes conduit means for providing fluid communication between said auxiliary burner and said fuel supply means.

15. A gas-fired grill apparatus comprising:
fuel supply means;
a housing having a compartment for a main gas burner and defined in part by a front wall opposite to a rear wall;
a pair of substantially parallel bars, each of said bars having a holding portion and a projecting portion;
an auxiliary gas burner;
mounting means for supporting said auxiliary gas burner between said holding portions of said bars;
a pair of channel members fixedly mounted on said housing and each extending along a corresponding on of said opposing front and rear walls of said housing, said channel members being dimensioned for slidably receiving said projecting portions of said bars so that said auxiliary gas burner is detachably mounted on said gas-fired grill in a cantilevered position to one side of said housing; and,
conduit means for conveying a fluid fuel between said fuel supply means and said auxiliary burner and between said fuel supply means and said main gas burner.

16. A side cooker apparatus according to claim 15 wherein said mounting means comprises a frame having a front wall opposite to a rear wall and each of said walls are connected to a corresponding one of the holding portions of said bars.

17. A side cooker apparatus according to claim 1 further having a top wall defining an opening for a burner element, support means for supporting a food cooking container over said burner element, and safety apparatus for preventing lateral movement of said cooking container off of said support means, said safety apparatus comprising a safety barrier for at least partially surrounding said food cooking container, and retainer means for mounting said safety barrier in a fixed position on said top wall, said safety barrier extending generally parallel and in spaced relation to the side of said food cooking container.

18. A side cooker apparatus according to claim 17 in which said safety barrier comprises at least a pair of vertically spaced apart, substantially coaxial wire rings and a plurality of wire legs, each extending vertically between and connected to said wire rings.

19. A side cooker apparatus according to claim 18 in which said wire rings comprise an upper ring and a lower ring, and each of said plurality of vertically extending wire legs includes a lower portion extending below said lower ring, and wherein said top wall is provided with a plurality of apertures surrounding said burner opening for receiving said lower portion of said legs.

20. A side cooker apparatus according to claim 17 in which said safety barrier comprises a metallic band having perforations in the wall thereof.

21. A side cooker apparatus according to claim 17 in which said safety barrier comprises a cylindrical band, and said top wall is provided with a plurality of apertures circumferentially spaced about said burner opening for cooperating with said retainer means for securing said cylindrical band in place on said top wall.

* * * * *

UNITED STATES PATENT AND TRADEMARK OFFICE
CERTIFICATE OF CORRECTION

PATENT NO. : 4,886,045

DATED : December 12, 1989

INVENTOR(S) : John S. Ducate, Jr., et al.

It is certified that error appears in the above-identified patent and that said Letters Patent is hereby corrected as shown below:

Column 7, line 35, change "on" to --one--.

Signed and Sealed this

Twenty-fifth Day of September, 1990

Attest:

HARRY F. MANBECK, JR.

*Attesting Officer*    *Commissioner of Patents and Trademarks*